Feb. 7, 1967
T. W. HENNESSEY
3,303,365
MOTOR HOUSING WITH AN OUTPUT SHAFT MOUNTED
IN A ROTATABLE BELL HOUSING
Filed May 4, 1964
2 Sheets-Sheet 1
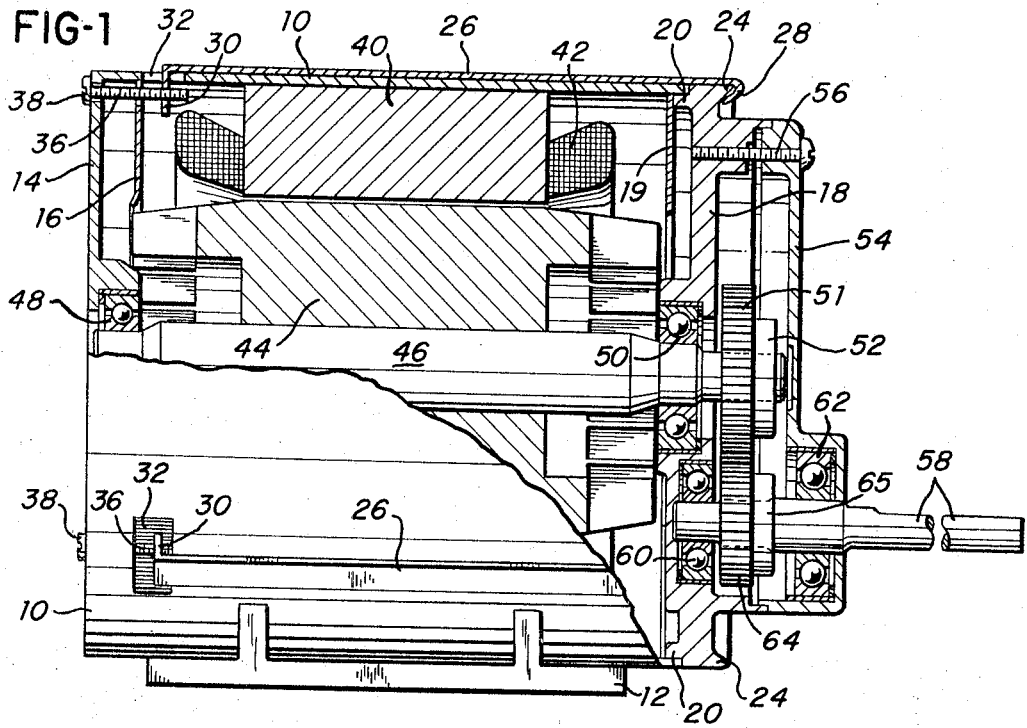
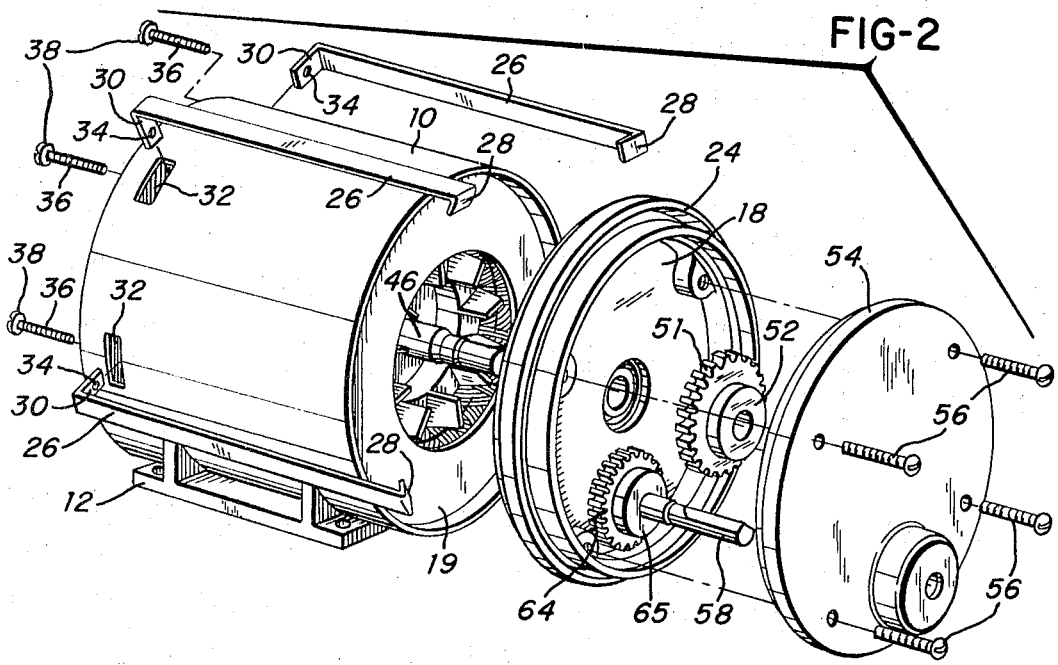
INVENTOR.
TIMOTHY W. HENNESSEY
BY William R Jacox
ATTORNEY

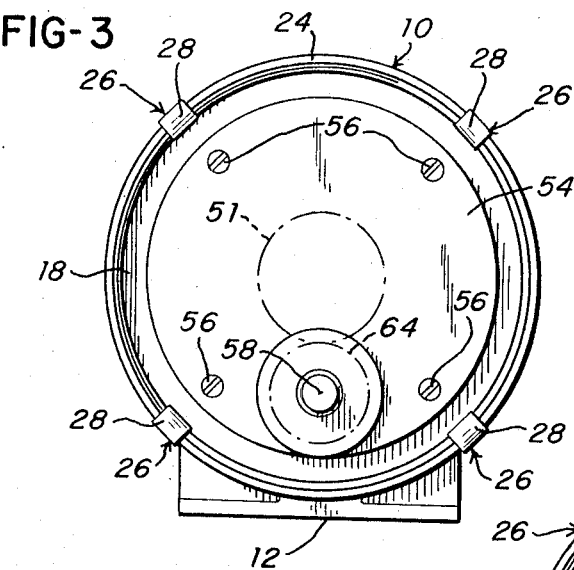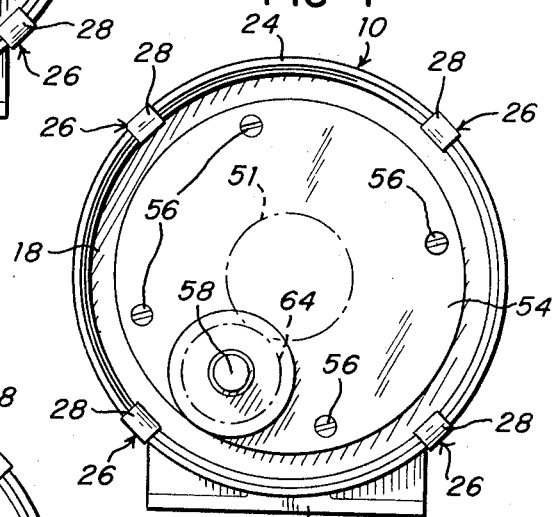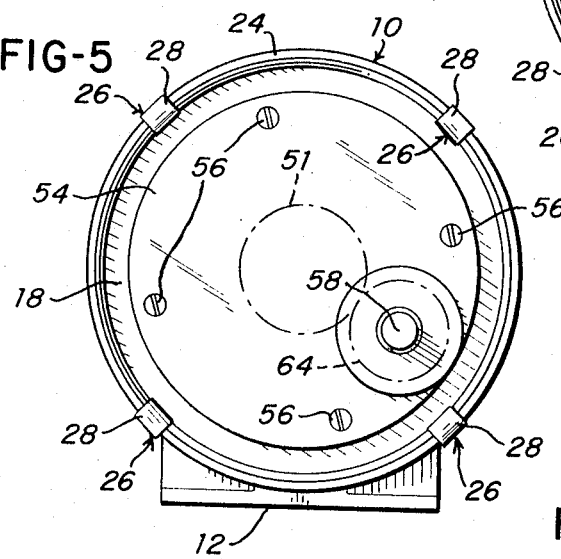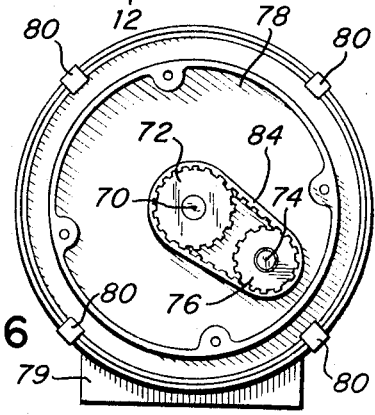

United States Patent Office 3,303,365
Patented Feb. 7, 1967

3,303,365
MOTOR HOUSING WITH AN OUTPUT SHAFT MOUNTED IN A ROTATABLE BELL HOUSING
Timothy W. Hennessey, Springfield, Ohio, assignor to Robbins & Myers, Inc., Springfield, Ohio, a corporation of Ohio
Filed May 4, 1964, Ser. No. 364,490
9 Claims. (Cl. 310—83)

This invention relates to a motor assembly.

The invention relates more particularly to a motor assembly having an output shaft which is spaced from the motor shaft and which may rotate at a rate which is different from the rate of rotation of the motor shaft.

Frequently, it is desired to have a motor assembly provided with an output shaft rotatable at any one of a plurality of rates. It is also desirable to have a motor assembly in which the output shaft can be readily positioned for direct connection to a load if reasonable space is available for the motor assembly.

It has been customary to product motion pictures in the motion picture industry by exposing frames of strip film at a standard rate. This rate of operation has been such that the input shaft of a standard motion picture projector machine has been operated at a rate of 1760 revolutions per minute. Therefore, the standard drive motor for a motion picture projector has had an output shaft which operates at 1760 r.p.m. when connected to a load consisting of a motion picture projector. It has now been found that professional motion picture projectors can be operated at a rate somewhat different from the previous rate. It has been found that a satisfactory motion picture projector input shaft rate is 1320 r.p.m., which is considerably less than the previously standardized rate of 1760 r.p.m.

Thus, a problem has arisen in the provision of a drive motor which can readily replace a 1760 r.p.m. drive motor. The new drive motor must have an output shaft rate of 1320 r.p.m. to operate a projector at the new standard rate. The new drive motor must also be capable of an output of 1760 r.p.m. in order to operate a projector at the former standard rate. Also, the new motor must be capable of fitting into the space formerly occupied by a single-speed 1760 r.p.m. motor.

It is therefore an object of this invention to provide a motor unit which has an output shaft which can be operated at either one of two speeds and which motor unit can be positioned within the space previously occupied by a former standard speed projector drive motor.

It is another object of this invention to provide an electric motor assembly having an output shaft which operates at either 1760 r.p.m. or 1320 r.p.m. when operating a motion picture projector.

It is another object of this invention to provide a gear-motor assembly which has an output shaft which is adjustably movable to any one of a plurality of positions with respect to other portions of the assembly.

Other objects and advantages reside in the construction of parts, the combination thereof, the method of manufacture, and the mode of operation, as will become more apparent from the following description.

In the drawings:

FIGURE 1 is a side sectional view of a motor assembly of this invention.

FIGURE 2 is an exploded perspective view, drawn on a slightly smaller scale, of the motor assembly of FIGURE 1.

FIGURE 3 is an end view of the motor assembly, showing the output shaft thereof in a given position.

FIGURE 4 is an end view similar to FIGURE 3 but showing the output shaft in another position.

FIGURE 5 is an end view similar to FIGURES 3 and 4 but showing the output shaft in another position.

FIGURE 6 is an end view, similar to FIGURES 3, 4, and 5, but with the cover member removed and showing other means for connection of two shafts one to the other for operation of the shafts one with the other.

Referring to the drawings in detail, a motor assembly of this invention is shown as comprising a motor housing or frame 10 which is supported by any suitable base 12. As shown at the left hand end of FIGURE 1, the housing 10 has an end cover 14 which may be attached thereto by any suitable means and is herein, for purposes of illustration, shown as being integral with the housing 10. Adjacent the end cover 14 is a baffle 16.

At the opposite end of the housing 10 is an end plate 18. Adjacent the end plate 18 is a baffle 19. The end plate 18 is shown as being joined to the housing 10 by means of an inner lateral projection 20 which snugly fits into the housing 10 to provide a rabbet fit or the like. Thus, the end plate 18 is rotatably adjustable with respect to the housing 10.

The end plate 18 also has an engagement portion in the form of an outer rim or flange 24 which may be completely annular, as shown in FIGURES 2, 3, 4, and 5 or the rim or flange 24 may comprise spaced-apart arcuate segments at the periphery of the end plate 18. Also, the engagement portion may be any desired shape other than that of a rim or flange 24, as shown.

One or more strap members or connector members 26 are disposed longitudinally at the outer surface of the housing 10. Each strap 26 has an engagement portion or hook portion 28 which engages or hooks over a portion of the rim or flange 24.

Each strap 26 has a lug portion 30 which is disposed within an opening 32 in the housing 10 adjacent the end cover 14. The lug portion 30 is provided with a threaded hole 34 which receives a threaded bolt or stud 36. Each stud 36 freely extends through the baffle 16 and through the end cover 14 and has a head 38, which engages the exterior surface of the end cover 14. Thus, by rotation of the head 38 the stud 36 is threadedly adjusted with respect to the lug 30. Thus, by rotation of the head 38 the strap 26 may be drawn toward the end cover 14 or loosened with respect thereto as each lug 30 is movable within its respective opening 32 of the housing 10. Thus, each stud 36 is threadedly rotated to draw its respective lug 30 toward the end cover 14, to draw the strap 26 toward the end cover 14. Thus, the hook portion 28 of the strap 26 is drawn firmly into engagement with the rim or flange 24 of the end plate 18. Thus, the end plate 18 is secured with respect to the housing 10.

Within the housing 10 is a magnetizable stator 40 which is provided with stator winding means 42, as shown in FIGURE 1. Within the stator 40 is a rotor 44 which has a shaft 46. The shaft 46 is rotatably supported by a bearing 48 carried by the end cover 14 and by a bearing 50 which is carried by the end plate 18.

The shaft 46 extends through the end plate 18 and carries a gear 51 which rotates with the shaft 46. A collar 52 is shown firmly engaging the gear 51 for retaining the position thereof with respect to the shaft 46.

A cover member 54 encloses the gear 51 and is attached to the end plate 18 by means of bolt or screw members 56.

An output shaft or drive shaft 58 is rotatably supported by a bearing 60 which is carried by the end plate 18 and by a bearing 62 which is carried by the cover member 54. Supported by the output shaft 58 and rotatable therewith is a gear member 64 which is in meshed relationship with the gear 51. A collar 65 is shown retaining the position of the gear 64 upon the shaft 58. The cover member 54 also encloses the gear 64.

Thus, rotation of the shaft 46 causes rotation of the gear 51 which causes rotation of the gear 64 which causes rotation of the output shaft 58.

As discussed above, the straps 26 retain the position of the end plate 18 with respect to the housing 10. Also, as stated above, the end plate 18 is rotatably adjustable with respect to the housing 10. The end plate 18 is rotatably adjustable about an axis which is coaxial with the axis of the shaft 46. However, in order to permit such rotative adjustment of the end plate 18, each of the straps 26 is loosened by loosening the studs 36 as the studs 36 are threadedly attached to the lugs 30 of the straps 26.

In many types of installations, problems arise in the positioning of an electric motor within a desired space so that the drive shaft thereof is properly positioned for direct connection to a load. For example, problems sometimes arise in the positioning of a two-speed motion picture drive motor within the space formerly occupied by a standard single-speed motion picture projector drive motor. The motion picture projector must be precisely disposed at a given location and position. However, such a location may provide a rather limited space for the location of a drive motor for the projector, or the required location of the motion picture projector may present problems in the positioning of the motor drive shaft for direct connection to the driven shaft of the motion picture projector.

In this invention the end plate 18 which is adjustably rotatable with respect to the housing 10 permits the locating of the output shaft 58 at various positions with respect to the housing 10 and with respect to the base 12. For example, FIGURES 1 and 3 show the output shaft 58 at a position adjacent the base 12. However, by loosening the studs 36 and the straps 26 so that the hooks 28 are loosened with respect to the rim 24, the end plate 18, with the cover member 54 attached thereto, can be rotatively moved with respect to the housing 10. Thus, the gear 64 moves about the axis of the gear 51 as the gear 64 remains in meshed relationship with the gear 51. Thus, the output shaft 58 is adjustably moved with respect to the housing 10 and with respect to the base 12.

For example, the output shaft 58 may be moved to a position as shown in FIGURE 4 or to a position as shown in FIGURE 5. The output shaft 58 may also be moved to any one of other positions by rotation of the end plate 18 with respect to the housing 10. Of course, if the rim or engagement portion 24 is completely annular, as shown in FIGURE 2, or if the straps 26 are engageable with any part of the engagement portion 24 of the end plate 18, the output shaft 58 may be adjustably moved to any rotative position within a range of 360 degrees with respect to the housing 10. After the position of the shaft 58 is adjusted with respect to the housing 10 by rotative movement of the end plate 18, the straps 26 are tightened by tightening the studs 36 so that the engagement portion 28 of each strap 26 again firmly engages the rim 24 of the end plate 18.

As stated above, the gear 64 is constantly in mesh with the gear 51, regardless of the position of the output shaft 58, thus a constant ratio exists between the rate of rotation of the shaft 46 and the rate of rotation of the output shaft 58.

It is to be understood that the motor assembly of this invention discussed above may be employed in many types of uses. Within the purview of this invention various rates of rotation of the shaft 46 may be used. Also, various ratios between the rate of rotation of the shaft 46 and the shaft 58 may be used. However, a discussion below pertains specifically to the use of the motor assembly of this invention as a motion picture projector drive motor.

As stated above, a problem has been presented by the selection of a new standard rate of motion picture projector operation. It is now desired to use the same motion picture projector for operation at either the new standard rate of 1320 r.p.m. or at the old standard rate of 1760 r.p.m. The permissible speed variation range at either of these standard rates of rotation is very limited. Thus, a motor assembly is required which is capable of operation of a projector at either of these standard rates and without appreciable speed variation.

The winding means 42 of the stator 40 is selected so that a six-pole winding thereof may be energized to provide a rate of rotation of the shaft 46 so that the output shaft 58 rotates at 1760 r.p.m. when the output shaft 58 is directly connected to a motion picture projector. Also, the winding means 42 is such that an eight-pole winding thereof may be energized to provide a rate of rotation to the shaft 46 so that the output shaft 58 rotates at 1320 r.p.m. when connected to a motion picture projector. Each of these output shaft rates of rotation occurs with a given established ratio between the rate of rotation of the shaft 46 and the rate of rotation of the drive shaft 58.

Thus, it is understood that the ratio between the gears 51 and 64 is such that the shaft 58 rotates at a higher rate than the shaft 46. Thus, the gear members 51 and 64 are selected to provide the desired rate of rotation of the output shaft 58 in consideration of the rate of rotation of the shaft 46 when the shaft 58 is connected in driving relationship to a motion picture projector. This desired rate of rotation of the output shaft 58 occurs when the stator winding means 42 has six-pole energization and when the winding means 42 has eight-pole energization.

For example, the load speed of the shaft 46 when the stator 40 is energized by a six-pole winding may be 1140 r.p.m. With such a rate of rotation of the shaft 46, if the ratio between the gear 51 and the gear 64 is 1.5437, the output shaft 58 rotates at 1760 r.p.m. when driving a motion picture projector. Also, the load speed of the shaft 46 when the stator 40 is energized by an eight-pole winding is 855 r.p.m. With this rate of rotation of 855 r.p.m. of the shaft 46 under load conditions and with the ratio of 1.5437 between the rate of rotation of the shaft 58 and the rate of rotation of the shaft 46, the output shaft 58 rotates at 1320 r.p.m. Thus, with a ratio of 1.5437 between the gears 51 and 64, the output shaft 58 rotates at 1320 r.p.m. or at 1760 r.p.m. when driving a motion picture projector.

Thus, it is understood that this invention provides means by which a motor assembly having a gear unit of a constant ratio provides energy for operation of a motion picture projector at either standard rate of 1760 r.p.m. or 1320 r.p.m. Also, this invention provides means by which a motor assembly having a dual speed output may be positioned in any one of many locations as a substitute for a single-speed projector motor.

FIGURE 6 illustrates other apparatus by which two shafts of an assembly of this invention are operably connected one to the other.

A motor shaft 70 supports a toothed wheel 72 for rotation therewith. An output shaft 74, which may be similar to the output shaft 58, carries a toothed wheel 76. The shaft 74 is carried by support means 78 which is rotatably carried by support structure (not shown) such as the housing 10, as discussed above. The support structure has a base 79. Connector members 80, which may be similar to the connector members 26, retain the position of the support means 78 with respect to the support structure.

A timing belt 84 engages the toothed wheels 72 and 76 and operably joins the wheels 72 and 76 one to the other.

Thus, it is understood that as the support means 78 is rotatably adjusted with respect to its support structure, the toothed wheel 76 and the shaft 74 are moved arcuately about the axis of the shaft 70, as the toothed wheels 72 and 76 remain operatively connected by means of the belt 84. Thus, the position of the shaft 74 can be adjusted with respect to the base 79 by rotative adjustment of the support means 78 in a manner discussed above with respect to the assembly of FIGURES 1–5.

It is to be understood that within the purview of this invention other means may be used to operatively connect a plurality of shafts together for support by support structure which is adjustably rotatable with respect to other elements of the assembly.

Thus, it is to be understood that this invention provides a motor assembly which may be used for any purpose and in which the output shaft thereof may be positioned at any one of a plurality of positions with respect to other portions of the assembly.

Although the preferred embodiment of the device has been described, it will be understood that within the purview of this invention various change may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Apparatus of the type described comprising:
   a motor housing,
   an electric motor stator within the motor housing and carried thereby,
   an electric motor stator within the motor housing and carried thereby,
   an electric motor rotor within the stator and rotatably carried by the motor housing,
   the rotor having a shaft,
   a drive gear attached to the shaft for rotation therewith,
   a gear housing carried by the motor housing and adjacent said drive gear, the gear housing having an engagement portion, the gear housing and the motor housing being relatively rotatable about the axis of the shaft,
   connector means carried by the motor housing and in engagement with the engagement portion of the gear housing to retain the gear housing in position with respect to the motor housing,
   a driven gear rotatably carried by the gear housing and in meshed relationship with the drive gear,
   an output shaft connected to the driven gear and rotatable therewith, the output shaft thus being adjustable with respect to the motor housing by relative rotative movement between the gear housing and the motor housing.

2. In combination with a motor provided with a housing and having a motor shaft extending therefrom at an end thereof,
   a gear unit carried by the housing at said one end thereof,
   the gear unit including support means, the support means being in engagement with the housing at said one end thereof, the support means being adjustably rotatable with respect to the housing, the support means being rotatable about an axis which is coaxial with the axis of the shaft,
   a drive gear attached to the motor shaft and disposed adjacent the support means,
   a driven gear adjacent the support means and in meshed relationship with the drive gear,
   an output shaft extending from the support means and rotatable with rotation of the driven gear, the output shaft thus being positionable at a plurality of positions with respect to the housing of the motor as the support means is adjustably rotated with respect to the housing.

3. In combination,
   an electric motor provided with a housing, the housing having a first end and a second end, the motor also having a rotary shaft, the rotary shaft having an extension portion at the first end of the housing,
   the second end of the housing being provided with an end member,
   the housing having a plurality of spaced-apart openings adjacent the end member,
   a drive gear attached to the extension portion of the rotary shaft at the first end of the housing,
   support means carried by the housing at the first end thereof, the support means having an engagement portion, the support means being rotatably carried by the housing and rotatable about an axis which is coaxial with the rotary shaft,
   a driven shaft rotatably carried by the support means,
   a driven gear carried by the driven shaft for rotation therewith and in meshed relationship with the drive gear,
   the support means having an engagement portion,
   a plurality of strap members, there being one strap member for each of the openings in the housing, each strap member having a threaded portion within one of the openings, each strap member extending along the exterior of the housing and having an engagement portion in engagement with the engagement portion of the support means,
   a plurality of threaded stud members, each stud member having a head in engagement with the end member, each stud member being freely rotatable with respect to the end member, each stud member having a portion within one of the openings of the housing and threadedly attached to the threaded portion of one of the strap members so that rotation of each stud member draws its respective strap member toward the end member so that the engagement portion of each strap member urges the support means toward the housing to secure the support means with respect to the housing,
   the output shaft being adjustable with respect to the housing by loosening of the straps by loosening of the stud members, such loosening operation permitting rotation of the support means with respect to the housing.

4. A motor assembly comprising:
   a housing,
   rotary motor means within the housing, the rotary motor means having a rotary drive shaft,
   a gear member attached to the drive shaft and rotatable therewith,
   an end member carried by the housing adjacent the gear member, the end member being rotatable with respect to the housing about an axis which is coaxial with the axis of the rotary drive shaft,
   a driven gear carried by the end member and in meshed relationship with the gear member,
   an output shaft connected to the driven gear for rotation therewith,
   a strap member engaging the end member, the strap member having a connection portion,
   adjustable connection means connected to the connection portion of the strap member and in engagement with the housing and securing the strap member with respect to the housing and thus securing the position of the end member with respect to the housing.

5. Gear-motor apparatus comprising:
   a motor provided with a rotary shaft, the motor also having a housing,
   drive gear means connected to the rotary shaft for rotation therewith,
   support structure carried by the housing and rotatable with respect thereto about an axis which is coaxial with the axis of rotation of the drive gear means,
   output means carried by the support structure, the output means including driven gear means in meshed relationship with the drive gear means, the output means also including output shaft means joined to the driven gear means.

6. Motor apparatus comprising:
   a motor having a housing, a cover member carried by the housing at one end thereof, support means carried by the housing at the other end thereof, the motor having a drive shaft extending through the end member, the support means being rotatable about the axis of the shaft, a drive gear attached to the drive shaft and rotatable therewith, an output shaft carried by the support means and spaced from the drive shaft, a driven gear attached to the output shaft and rotatable therewith, the driven gear being in meshed relationship with the drive gear, the support means having an engagement portion adjacent the periphery thereof, a plurality of elongate straps, each of the straps having an engagement portion in engagement with the engagement portion of the support means, a plurality of threaded stud members carried by the cover member and threadedly attached to the straps, there being one threaded stud member for each of the straps for securing the strap to the housing and for securing the engagement portion of the strap in engagement with the engagement portion of the support means.

7. The apparatus of claim 6 in which the engagement portion of the support means is a lateral rim, and in which the engagement portion of each strap is a hook which hooks over the rim.

8. The apparatus of claim 7 in which the engagement portion of the support means is annular.

9. The apparatus of claim 6 in which the housing is provided with a plurality of openings adjacent the cover member, and each of the stud members loosely extends through the cover member and into one of the openings, and a portion of each of the straps is disposed within the opening for attachment to a stud member.

References Cited by the Examiner

UNITED STATES PATENTS

| | | | |
|---|---|---|---|
| 2,465,042 | 3/1949 | Schlenker | 310—83 |
| 2,820,938 | 1/1958 | Davies | 318—224 |
| 3,153,158 | 10/1964 | Schmitter | 310—83 |
| 3,167,700 | 1/1965 | Neyhouse | 318—224 |
| 3,207,967 | 9/1965 | Athey | 318—224 |

MILTON O. HIRSHFIELD, *Primary Examiner.*

J. D. MILLER, *Assistant Examiner.*